United States Patent [19]

Firebaugh

[11] 4,195,621
[45] Apr. 1, 1980

[54] SOLID STATE DIFFERENTIAL TEMPERATURE REGULATOR FOR A SOLAR HEATING SYSTEM

[75] Inventor: Dale C. Firebaugh, Carson City, Nev.

[73] Assignee: Richdel, Inc., Carson City, Nev.

[21] Appl. No.: 864,333

[22] Filed: Dec. 27, 1977

[51] Int. Cl.² ............................................... F24J 3/02
[52] U.S. Cl. .................................. 126/416; 126/400; 126/422
[58] Field of Search ................. 126/270, 271, 400; 237/1 A; 4/172.17

[56] References Cited

U.S. PATENT DOCUMENTS

| | | | |
|---|---|---|---|
| 3,906,928 | 9/1975 | Wright | 126/271 |
| 3,998,207 | 12/1976 | Watt | 126/271 |
| 4,019,495 | 4/1977 | Frazier et al. | 126/271 |
| 4,061,132 | 12/1977 | Ashton et al. | 165/18 |
| 4,102,328 | 7/1978 | Stiff | 237/1 A |
| 4,116,219 | 9/1978 | Nurnberg | 237/1 A |
| 4,125,107 | 11/1978 | Nurnberg | 237/1 A |
| 4,126,122 | 11/1978 | Bross | 237/1 A |
| 4,129,118 | 12/1978 | Banke | 126/271 |

Primary Examiner—James C. Yeung
Assistant Examiner—Larry Jones
Attorney, Agent, or Firm—Keith D. Beecher

[57] ABSTRACT

A solid state temperature regulator is provided for a solar heating system for use in conjunction with a swimming pool, or the like. The solar swimming pool heating system includes the usual components, namely, a pump, a filter, and a collector, and in which the pump serves to circulate the water from the pool through the filter and collector and back into the pool. The system also includes additional components, namely, temperature sensors for the collector and for the circulated pool water, appropriate valves, and a solid state control circuit. The solid state control circuit responds to predetermined temperature differences sensed by the sensors to cause the pool water to be circulated through the collector so long as the collector is at a higher temperature than the circulated pool water, and which causes the circulated pool water to by-pass the collector when the temperature of the collector drops below the temperature of the circulated pool water. The control circuit also has a high temperature cut-off control which activates the valves to cause the circulated pool water to by-pass the collector when the temperature of the circulated pool water exceeds a particular threshold. The control circuit also includes a mode switch which may be actuated to reverse the action of the system, causing the pool water to be circulated through the collector when the collector temperature is lower than the pool water temperature, for example, at night following a hot day, in which the collector radiates to the black sky, whereby the collector can be used to cool the water in the pool.

3 Claims, 3 Drawing Figures

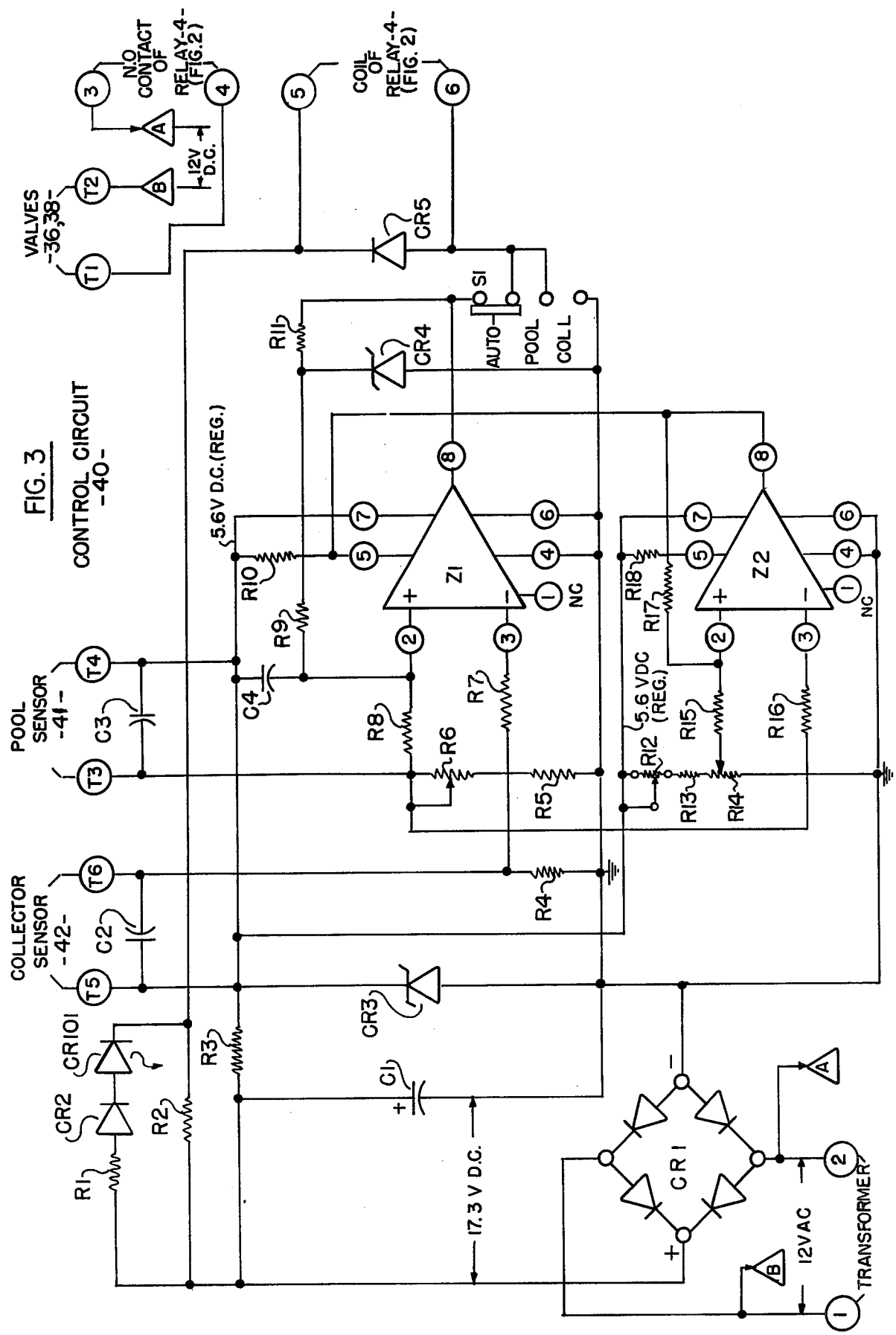

SOLID STATE DIFFERENTIAL TEMPERATURE REGULATOR FOR A SOLAR HEATING SYSTEM

BACKGROUND

A conventional swimming pool system includes a filter and pipes, and a pump for circulating the pool water through the filter and back into the pool. A gas or electric heater is also usually included in the system, and the heater serves to heat the circulated water whenever the temperature of the circulated water drops below a preset level. Such a system can be converted into a solar system by including a solar heat collector in the circulating system. Problems arise, however, in the prior art systems because when the collector temperature drops below the pool water temperature, the collector acts to cool the pool water, rather than to heat the pool water which is usually undesirable.

The system of the present invention, as stated above, includes a solid state control circuit, and the control circuit provides a simple and inexpensive means for automatically controlling the temperature of the water circulation, so that the water is caused to pass through the collector only when the collector temperature is higher than the temperature of the pool water, and which causes the pool water to by-pass the collector when the collector temperature drops below the temperature of the pool water.

However, as described above, the control circuit of the invention can also be controlled to circulate the pool water through the collector when the temperature of the collector is below the temperature of the pool water, such as at night following a hot day, so that the collector can be used to cool the pool water down to desirable swimming temperatures.

BRIEF DESCRIPTION OF THE DRAWINGS

FIG. 3 is a circuit diagram of the solid state control circuit.

DETAILED DESCRIPTION OF THE ILLUSTRATED EMBODIMENT

Figure 1:
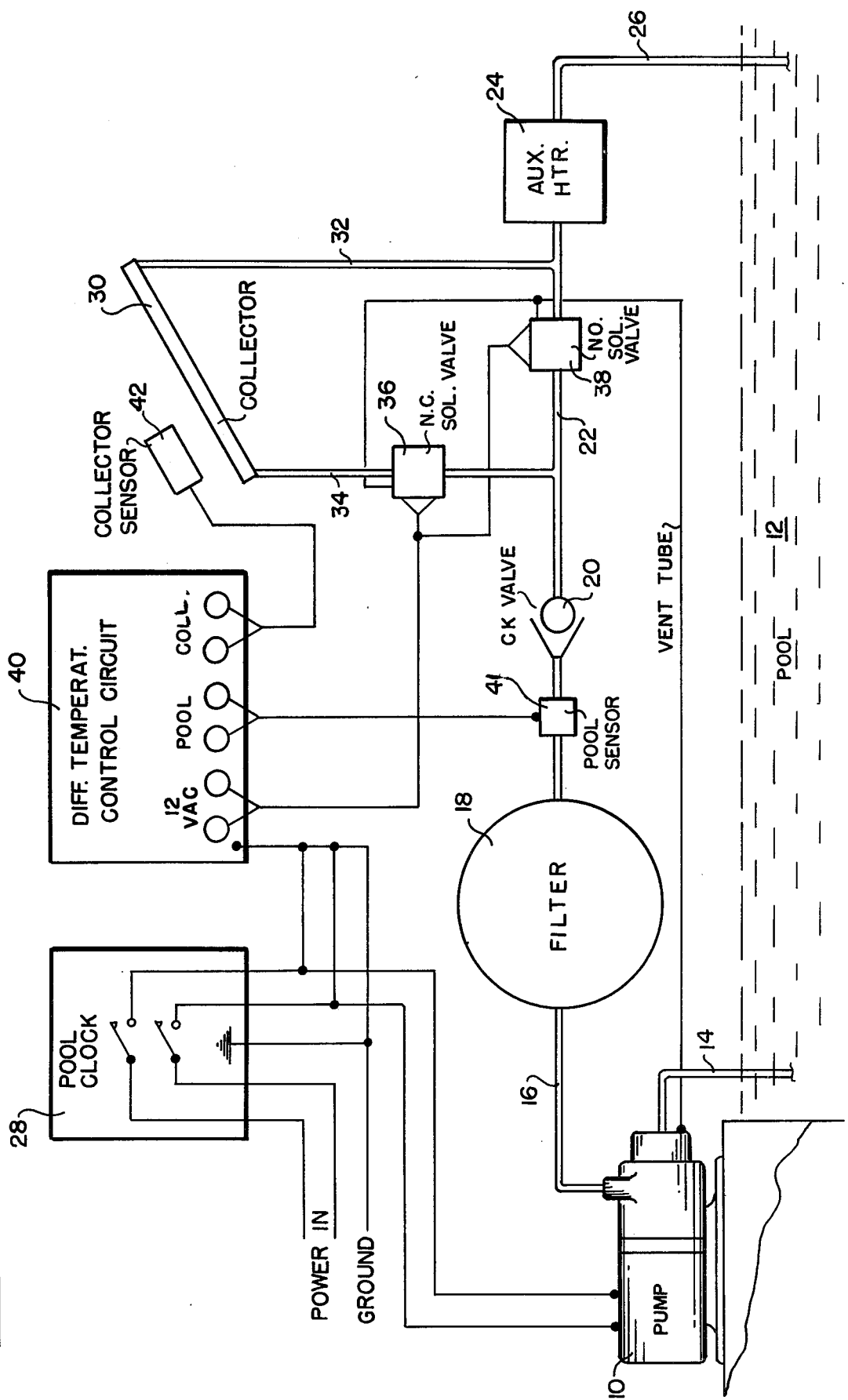
FIG. 1 is a schematic representation of a solar pool control system including the solid state control circuit of the present invention.

In the schematic diagram of FIG. 1, a pump 10 pumps water out of a swimming pool 12 through an inlet pipe 14, and forces the water through an outlet pipe 16, through a filter 18, and through a check valve 20 and through a further pipe 22. Pipe 22 is coupled to an auxiliary heater 24, the outlet of which is connected through a further pipe 26 to the pool 12. In the conventional system, pump 10 is activated for selected intervals by a pool clock 28.

When the pump is activated in the conventional system, it circulates water from the pool 12 through the filter 18 and through the auxiliary heater 24 back into the pool. The auxiliary heater 24 is controlled so that it is activated whenever the temperature of the circulated pool water falls below a preset temperature level.

In the solar heating system of the present invention, a solar collector 30 is connected to the pipe 22 through an inlet pipe 34 and outlet pipe 32. A normally-closed solenoid valve 36 is connected in pipe 34, and a normally-open solenoid valve 38 is connected in pipe 22 between the pipes 32 and 34.

A temperature sensor 41 is interposed in the pipe 22 adjacent to filter 18, and a second temperature sensor 42 is positioned adjacent to the collector 30. The sensors 41 and 42 may be of any known type, such as thermistors, or the like, which are capable of providing variations in electric current as a function of temperature variations sensed by the sensors.

The sensors 41 and 42 are connected to a differential temperature control circuit 40 which in shown in more detail in FIG. 3, and which may be a solid state type. Whenever the collector sensor 42 indicates that the collector temperature is, for example, 5° F. hotter than the circulating pool water temperature, as sensed by the pool sensor 40, the internal circuitry of the differential temperature control circuit 40 energizes both the valves 36 and 38, causing valve 38 to close and valve 36 to open, so that the water circulating from the filter 18 is caused to circulate through the collector 30, prior to being circulated through the auxiliary heater 34.

The flow of water through the collector 30 continues unless the collector temperature drops to within 2° F. of the pool temperature, or the pool temperature rises to within 2° F. of the collector temperature. When that occurs, the control circuit 40 de-activates the solenoid valves 36 and 38, so that solenoid valve 36 closes and solenoid valve 38 opens, and the water circulated through the system by pump 10 now by-passes the collector 30.

The control circuit 40 also includes a high temperature cut-off control which, for example, is adjustable from 70° F. to 95° F. Should the circulating pool water exceed the maximum preset temperature, as sensed by the pool sensor 40, an overriding circuit in the control circuit 40 will cause the valves 36 and 38 to become de-energized, so that the circulating water is caused to by-pass the collector. This overriding circuit remains effective so long as the circulating pool water temperature is above the pre-set maximum value. When the circulating pool water temperature drops to below the maximum pre-set value, the override control is discontinued, and the circuit returns to normal operation.

As mentioned above, the control circuit 40 includes a mode switch which reverses the control of the valves 36 and 38 to cause the pool water to circulate through the collector 30 when the collector temperature is below the temperature of the circulating water, rather than above. This mode switch, as mentioned above, is useful at night following a hot day, to cause the collector to act as a radiator to cool the pool water down to acceptable temperature levels.

Figure 2:
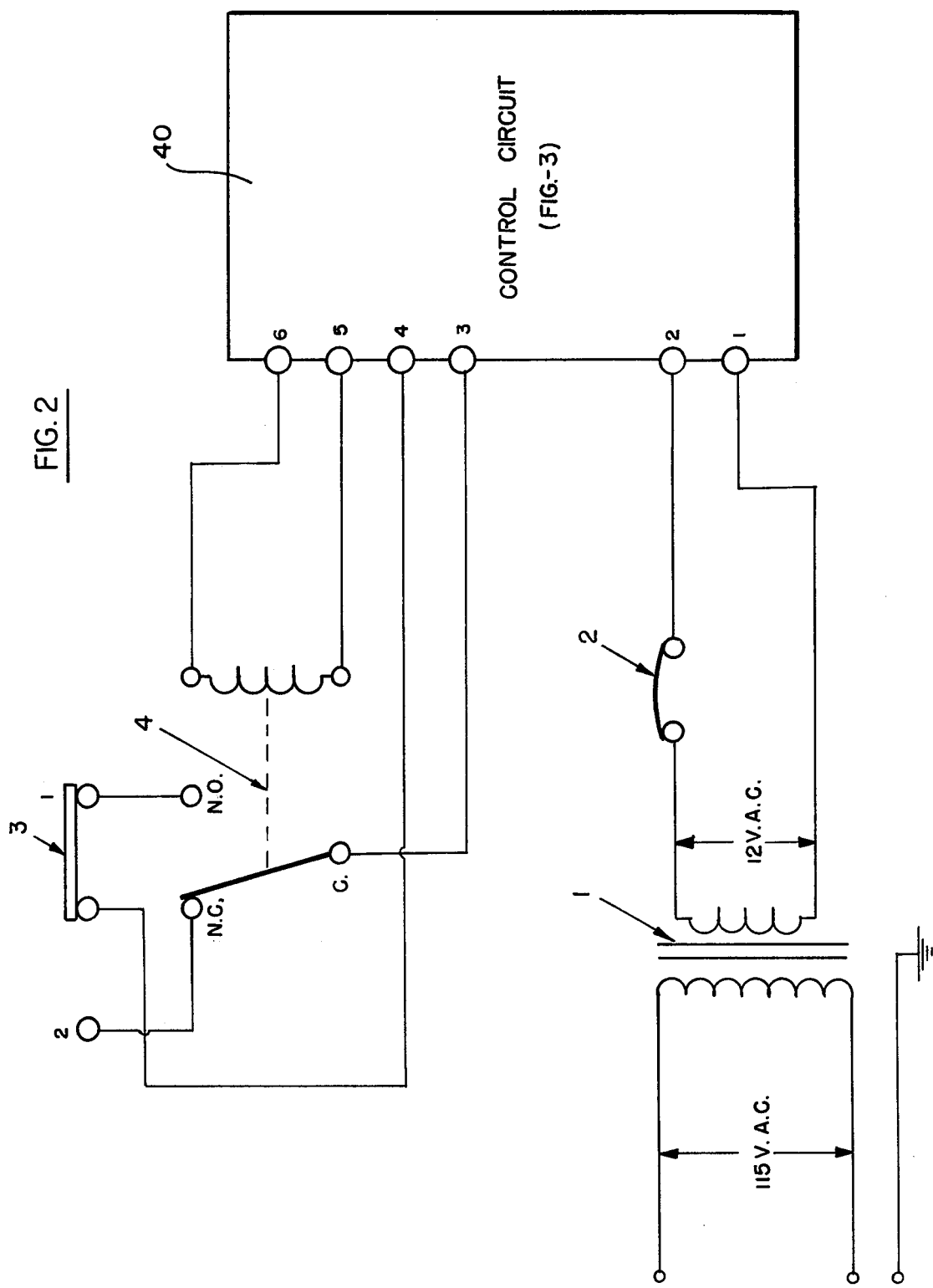
FIG. 2 is a circuit diagram illustrating certain electrical connections made to a solid state control circuit.

Such a mode switch is designated 3 in FIG. 2, and it has a first position in which its common terminal is bridged to a terminal 1, and a second position in which its common terminal is bridged to a terminal 2. Terminals 1 and 2 are connected respectively to the normally open (N.O) and normally closed (N.C.) contacts of a relay designated 4. The coil of relay 4 is connected to pins 5 and 6 of the control circuit 40. The common contact of the relay is connected to pin 3, whereas the common terminal of mode switch 3 is connected to pin 4.

Alternating current voltage derived from a usual 115-volt alternating current source is reduced, for example, to 12-volts AC by a transformer designated 1, the secondary of the transformer being connected through a circuit breaker 2 to pins 1 and 2 of the control circuit 40.

The 12-volt alternating current voltage applied to pins 1 and 2 of control circuit 40 is rectified, as shown in the circuit of FIG. 3 by a bridge rectifier designated CR1 to produce a DC voltage of approximately 17.3 volts. This DC voltage is reduced and regulated by a 5.6-volt Zener diode CR3 connected through a 330 ohm resistor R3 across the rectifier. A 500 microfarad filter capacitor C1 is also connected across the rectifier. The Zener diode CR3 may be of the type designated IN47-34A, and the bridge rectifier CR1 may be of the type designated VM-18. The Zener diode CR3 reduces the DC voltage to approximately 5.6 volts, and serves as a regulating means, so that the resulting voltage remains constant in the presence of varying line voltages and varying output voltages from the transformer 1 of FIG. 2, and with the on and off loads presented by the valves 36 and 38 controlled by the circuit.

The control circuit of FIG. 3 includes a pair of operational amplifiers designated Z1 and Z2. These operational amplifiers may be of the type designated CA3094T. The operational amplifiers are constructed so that when the potential differential across their input pins 2 and 3 exceeds a particular value, the potential at the output pin 8 drops from a predetermined positive value to 0 potential. The collector sensor 42 is connected to terminals T5 and T6, and the pool sensor 40 is connected to terminals T3 and T4 in the circuit of FIG. 3. Terminal T5 is connected to the 5.6 volt DC lead, as is terminal T4. Terminal T6 is connected to a grounded 1.8 kilo-ohm resistor R4, and through a 10 kilo-ohm resistor R7 to pin 3 of operational amplifier Z1. Terminal T3 is connected to a 500 ohm potentiometer R6, and through a 10 kilo-ohm resistor R8 to pin 2 of differential amplifier Z1. Potentiometer R6, in turn, is connected to a 1.6 kilo-ohm resistor R5.

Pin 2 of operational amplifier Z1 is also connected to the junction of an 820 kilo-ohm resistor R9 and 0.1 microfarad capacitor C4. Pin 5 of operational amplifier Z1 is connected to a 56 kilo-ohm resistor R10. Capacitor C4, resistor R10, and pin 7 of operational amplifier Z1 are all connected to the +5.6-volt DC line. Resistor R9 is connected to the junction of a 5.6-volt Zener diode CR4 and a 510 ohm resistor R11. The Zener diode may be of the type designated IN4734A, and its anode is grounded. The output pin 8 of operational amplifier Z1, and resistor R11 are both connected to one contact of a switch S1. The switch S1 has two intermediate contacts which are connected together and to terminal 6 which is connected to the coil of relay 4 in FIG. 2. The switch S1 has a further terminal which is grounded. The switch has three positions designated "AUTO", "POOL" and "COLL".

The positive terminal of bridge rectifier CR1 is also connected through an 82 ohm resistor R2 to terminal 5 of the circuit, which also is connected to the coil or relay 4. Terminals 5 and 6 are shunted by a diode CR5 which may be of the type designated IN4002. Resistor R2 is shunted by a 180 ohm resistor R1, by a diode CR2 which may be of the type designated IN4002, and by a light emitting diode CR101, which may be of the type designated MV5020.

Terminals 3 and 4 of the circuit are connected to the normally open (N.O.) contact of relay 4 of FIG. 2. Terminal 3 is connected to one side of the 12-volt alternating current line. The valves 36 and 38 of FIG. 1 are connected to terminals T1 and T2, terminal T1 being connected to terminal 4, and terminal T2 being connected to the other side of the 12-volt alternating current line.

As stated above, the circuit of FIG. 3 also includes a second operational amplifier Z2 which, likewise may be of the type designated CA3094T. A 1.0 ohm potentiometer R12 is connected to the 5.6 volt DC line and to a 1.0 kilo-ohm resistor R13. Resistor R13 is connected to a 500 ohm potentiometer R14 which is grounded. The movable contact of potentiometer R14 is connected through a 10 kilo-ohm resistor R15 to the positive input pin 2 of operational amplifier Z2. Terminal T3 of pool sensor 40 is connected through a 10 kilo-ohm resistor R16 to the negative input pin 3 of operational amplifier Z2. The positive input pin 2 of the operational amplifier Z2 is connected through a 200 kilo-ohm resistor R17 to pin 5 of amplifier Z1, as is the output pin 8 of amplifier Z2.

The operational amplifiers Z1 and Z2 operate as differential amplifiers. The pool and collector sensors 40 and 42 are connected in a bridge configuration, with resistors R4 and R5 forming the bottom legs of the bridge. The junctions of the sensors and their resistor legs are respectively connected to the differential inputs of the operational amplifier Z1 through resistors R7 and R8. Feedback resistor R9 supplies a selected amount of voltage to the non-inverting input pin 2 of the operational amplifier Z1, and this selected voltage, along with the adjustment of potentiometer R6, sets the differential on and off temperatures at which the operational amplifier is to respond.

The circuit is set so that the relay 4 of FIG. 2 is activated by the output of the operational amplifier Z1 through switch S1 when the collector sensor 42 indicates that the temperature of the collector of 5° F. above the temperature of the circulated pool water as sensed by sensor 40. When the temperature of the collector drops to within 2° F. of the temperature of the pool water, or when the temperature of the pool water rises to within 2° F. of the temperature of the collector, the relay will be de-energized. This on and off action of relay 4 supplies or terminates the application of the 12-volt alternating current to the valve output terminals T1 and T2 thus turning the valves off and on, as described above.

The action described in the preceding paragraph allows the pool water to recirculate back to the pool and by-pass the collector 30 until the collector sensor 42 indicates that the temperature of the collector is 5° F. above the temperature of the circulated pool water. When that occurs, the control circuit operates the valves to cause the circulating water to circulate through the collector 30.

The second operational amplifier Z2 has its non-inverting input pin 2 connected by way of resistor R14 to potentiometer R14. With the panel mounted potentiometer R12 set to zero ohms, potentiometer R14 is adjusted so that it, along with the feedback voltage from resistor R17 sets the high temperature limit. The inverting input pin 3 is connected by way of resistor R16 to the bridge junction of the pool sensor 40. When the pool sensor produces a voltage sufficient to operate the operational amplifier Z3, the output at pin 8 of the operational amplifier Z2 will go to ground, thus grounding the programming pin 5 of operational amplifier Z1, thereby squelching the operational amplifier Z1 to de-energize relay 4 of FIG. 2 which in turn de-energizes the solenoid valves 36 and 38, causing the circulating water to by-pass the collector 30. The potentiometers R12 and R14 may be set to respond to a pool water temperature of 95° F., for example. As the resistance of the potentiometer R12 is increased, the limit trip point is lowered. When potentiometer R12 is set to its full value of 1 kilo-ohm, the trip point will be 25° F. lower than the zero ohm maximum setting. Potentiometer R12 provides a panel control for the user, permitting the user to select the maximum temperature of the pool.

Switch S1 allows the user to select the operation of the control circuit. In "AUTO" the control circuit automatically responds to the sensors 40 and 42 to control the circulation of the water, as described above. In the "POOL" position of switch S1 the relay coil is disconnected, so that the relay remains de-energized, and the valves 36 and 38 are de-activated so that water at all times by-passes the collector, and circulates in a normal manner through the pool circulating system. When the switch S1 is in the "COLL" position the relay is energized regardless of the state of the control circuit, so that the pool water is directed through the collector.

The mode switch 3 of FIG. 2, as described above, permits the control circuit to achieve a reverse function to cause the pool water to be diverted through the collector 30 when the collector is cooler than the pool water, so that the collector may be used to cool the pool water.

The feedback resistor R9 associated with the operational amplifier Z1, and the feedback resistor R17 associated with the operational amplifier Z2, supply a portion of the voltage at the output pin 8 back to the non-inverting input pin 2. Pin 8 of operational amplifier Z2 is connected to the regulated 5.6 VDC line by way of resistor R10. By deriving its feedback voltage from this regulated voltage there is a constant voltage supplied when the alternating current line voltage fluctuates, or varies, and when the secondary of transformer 1 of FIG. 2 is loaded down by the solenoid valves 36 and 38. Thus, the operating points of the operational amplifier Z2 are held constant.

The feedback circuit of the operational amplifier Z1 is different from that of operational amplifier Z2. The output pin 8 of operational amplifier Z1 is connected to the unregulated 17.3-volt direct voltage supply through the coil of relay 4 with its shunted diode suppressor CR5. Now with an alternating current line change, or varying secondary voltage due to load changes, the voltage feedback by the feedback resistor R9 will also be changing which in turn will cause the operating point of the operational amplifier Z1 to change. This causes the turn-on and turn-off points to vary and to be out of tolerance. However, the output circuit of operational amplifier Z1 has another resistor R11 in series with the feedback resistor R9, and a Zener diode CR4 is connected between the junction of these two resistors and ground. This addition to the feedback circuit of the operational amplifier Z1 is very important.

Resistor R11 is a limiting resistor for the Zener diode CR4 which assures that the Zener diode will regulate at 5.6 volts with AC line change and/or changes in load on the transformer secondary. Even with all these changes, a fixed voltage is fed back to pin 2 by resistor R9. This feedback voltage remains constant and thus, the trip points of operational amplifier Z1 remain constant holding the 5° F. and 2° F. trip points to a very close tolerance even in the presence of 105 VAC to 125 VAC line changes, and to secondary transformer load changes from zero to 1.25 amperes.

The invention provides, therefore, an improved solar pool control system which includes a solid state control circuit which operates with a high degree of stability to control the circulation of pool water through the system.

While a particular embodiment of the invention has been shown and described, modifications may be made. It is intended in the claims to cover the modifications which come within the true spirit and scope of the invention.

What is claimed is:

1. A solid state differential temperature control circuit for regulating a solar heating system, said solar heating system including a water circulating assembly including a pipeline and a pump for circulating water from a water-containing receptacle through the pipeline and back into the receptacle, a solar collector coupled to the pipeline, and valve means mounted in said pipeline to control the flow of water through said pipeline, said valve means having a first operating position for causing the water in the pipeline to circulate through the collector, and having a second operating position for causing the water in the pipeline to by-pass the collector, a first sensor for sensing the temperature of the water in the pipeline, and a second sensor for sensing the temperature of the collector, said solid state control circuit including: a first differential amplifier having first and second input terminals and further having an output terminal, said first differential amplifier having a third input terminal which when established at a reference potential squelches the output of said first differential amplifier and develops a first output level at the output terminal and said first differential amplifier producing said first output level at the output terminal when the amplitude differential of a pair of inputs applied to its input terminal exceeds a particular value, and said first differential amplifier producing a second output level at its output terminal when the amplitude differential of said first pair of inputs applied to its input terminals falls below a particular minimum value; a resistance bridge circuit connected to the first and second sensors and to the first and second input terminals of said first differential amplifier; a relay circuit connected to the output terminal of the first differential amplifier and to said valve means to operate said valve means so as to cause the water in the pipeline to circulate through the collector when the output of said first differential amplifier is established at said first level, and to cause the water in the pipeline to by-pass the collector when the output of said first differential amplifier is established at said second level; a second differential amplifier having first and second input terminals and an output terminal, said second differential amplifier producing a first output level at its output terminal when the amplitude differential of a pair of inputs applied to its input terminals exceeds a particular maximum value, and said second differential amplifier producing a second output level at its output terminal when the amplitude differential of said pair of inputs supplied to its input terminals falls below a particular minimum value; first circuit means connecting one of the input terminals of the second differential amplifier to a source of reference potential, second circuit means connecting the other input terminal of the second differential amplifier to the first sensor; and third circuit means connecting the output terminal of the second differential amplifier to the third input terminal of said first differential amplifier to squelch the output of said first differential amplifier when the output of said second differential amplifier is at the first output level so as to establish the first output level at the output terminal of the first differential amplifier and thereby to cause the relay circuit to operate the valve means and cause the water in the pipeline to bypass the collector, and which includes a mode switch connected in said relay circuit having a first position in which said relay circuit causes the valve means to cause the water in the pipeline to circulate through the collector when the output of the first differential amplifier is at said first level, and said mode switch having a second position in which said relay circuit causes the valve means to cause the water in the pipeline to by-pass the collector when the output of the first differential amplifier is at said first level.

2. A solid state differential temperature control circuit for regulating a solar heating system, said solar heating system including a water circulating assembly including a pipeline and a pump for circulating water from a water-containing receptacle through the pipeline and back into the receptacle, a solar collector coupled to the pipeline, and valve means mounted in said pipeline to control the flow of water through said pipeline, said valve means having a first operating position for causing the water in the pipeline to circulate through the collector, and having a second operating position for causing the water in the pipeline to by-pass the collector, a first sensor for sensing the temperature of the water in the pipeline, and a second sensor for sensing the temperature of the collector, said solid state control circuit including: a first differential amplifier having first and second input terminals and further having an output terminal, said first differential amplifier having a third input terminal which when established at a reference potential squelches the output of said first differential amplifier and develops a first output level at the output terminal and said first differential amplifier producing said first output level at the output terminal when the amplitude differential of a pair of inputs applied to its input terminal exceeds a particular value, and said first differential amplifier producing a second output level at its output terminal when the amplitude differential of said first pair of inputs applied to its input terminals falls below a particular minimum value; a resistance bridge circuit connected to the first and second sensors and to the first and second input terminals of said first differential amplifier; a relay circuit connected to the output terminal of the first differential amplifier and to said valve means to operate said valve means so as to cause the water in the pipeline to circulate through the collector when the output of said first differential amplifier is established at said first level, and to cause the water in the pipeline to by-pass the collector when the output of said first differential amplifier is established at said second level; a second differential amplifier having first and second input terminals and an output terminal, said second differential amplifier producing a first output level at its output terminal when the amplitude differential of a pair of inputs applied to its input terminals exceeds a particular maximum value, and said second differential amplifier producing a second output level at its output terminal when the amplitude differential of said pair of inputs supplied to its input terminals falls below a particular minimum value; first circuit means connecting one of the input terminals of the second differential amplifier to a source of reference potential, second circuit means connecting the other input terminal of the second differential amplifier to the first sensor; and third circuit means connecting the output terminal of the second differential amplifier to the third input terminal of said first differential amplifier to squelch the output of said first differential amplifier when the output of said second differential amplifier is at the first output level so as to establish the first output level at the output terminal of the first differential amplifier and thereby to cause the relay circuit to operate the valve means and cause the water in the pipeline to bypass the collector, and which includes a feedback circuit connected between the output terminal and one of the input terminals of the first differential amplifier; and a voltage regulating circuit connected to the feedback circuit to cause the feedback voltage to be independent of exciting voltage variations and thereby to render the operating points of the first differential amplifier independent of such exciting voltage variations.

3. The control circuit defined in claim 2, in which said feedback circuit includes a first resistor, and said regulating circuit includes a second resistor series connected to the first resistor and connecting the first resistor to a source of unregulated exciting potential, and said regulating circuit further includes a Zener diode connected to the common junction of the first and second resistors and to a point of reference potential.

* * * * *